United States Patent
Harms et al.

(10) Patent No.: US 9,498,853 B2
(45) Date of Patent: Nov. 22, 2016

(54) AMORPHOUS CAESIUM ALUMINUM FLUORIDE COMPLEX, ITS PRODUCTION AND USE

(76) Inventors: Gerd J. Harms, Goslar (DE); Hartmut Hofmann, Kelkheim (DE); Klaus-Peter Lehmann, Langelsheim (DE); Alexander Schiedt, Hahausen (DE)

(*) Notice: Subject to any disclaimer, the term of this patent is extended or adjusted under 35 U.S.C. 154(b) by 544 days.

(21) Appl. No.: 12/086,200

(22) PCT Filed: Dec. 20, 2006

(86) PCT No.: PCT/EP2006/069957
§ 371 (c)(1),
(2), (4) Date: Sep. 3, 2008

(87) PCT Pub. No.: WO2007/074117
PCT Pub. Date: Jul. 5, 2007

(65) Prior Publication Data
US 2009/0032573 A1     Feb. 5, 2009

(30) Foreign Application Priority Data
Dec. 22, 2005   (DE) .......... 10 2005 062 087

(51) Int. Cl.
*B23K 31/02*     (2006.01)
*B23K 35/36*     (2006.01)

(52) U.S. Cl.
CPC ......... *B23K 35/3605* (2013.01); *B23K 35/361* (2013.01)

(58) Field of Classification Search
CPC .......... B23K 35/361; B23K 35/3605
USPC .......... 148/24
See application file for complete search history.

(56) References Cited

U.S. PATENT DOCUMENTS

| 4,689,092 A | 8/1987 | Suzuki et al. |
| 4,923,530 A | 5/1990 | Miki et al. |
| 5,171,377 A | 12/1992 | Shimizu et al. |

FOREIGN PATENT DOCUMENTS

| EP | 0 785 045 A | 7/1997 |
| GB | 2 241 513 A | 9/1991 |

OTHER PUBLICATIONS

Bentrup, et al., "Polymorphism of CsAlF4. Synthesis and Structure of Two New Crystalline Forms," European Journal of Solid State and Inorganic Chemistry, vol. 29 No. 2, pp. 371-381, 1992.*

* cited by examiner

*Primary Examiner* — Jessee Roe
*Assistant Examiner* — Christopher Kessler
(74) *Attorney, Agent, or Firm* — Jeremy J. Kliebert

(57) ABSTRACT

The present invention provides an amorphous caesium aluminum fluoride complex, a process for its production and the use of the complex as a flux, in particular for the soft soldering of aluminum.

33 Claims, 2 Drawing Sheets

Abscissa: Temperature [°C]
Ordinate: Heat Flux

Abscissa: Temperature [°C]
Ordinate: Heat Flux

AMORPHOUS CAESIUM ALUMINUM FLUORIDE COMPLEX, ITS PRODUCTION AND USE

This application is a §371 of PCT/EP2006/069957 filed Dec. 20, 2006, which claims priority from German Patent Application No: 10 2005 062 087.6 filed Dec. 22, 2005.

FIELD OF THE INVENTION

The present invention provides an amorphous caesium aluminium fluoride complex, a process for its production and the use of the complex as a flux, in particular for the soft soldering of aluminium.

BACKGROUND OF THE INVENTION

The use of caesium fluoroaluminates as fluxes for soldering aluminium materials is known. The low melting point and hence the ability to solder even magnesium-containing aluminium alloys opens up many applications and developments. In the automotive industry, for example, the trend in recent years has been towards ever smaller radiators, which operate at ever greater pressures. This has led to increased strength requirements for the radiators, and this has been reflected in a higher magnesium content in the aluminium alloys. This development has also given rise to greater requirements for fluxes. In order to meet these requirements, it must be possible to tailor a flux specifically to the individual application. A critical requirement here is the ability to adjust the melting point of a flux across a broad range and above all also to allow a low melting point or melting onset below 440° C. The flux should be resistant, to oxidation for example, and be able to be processed into pastes and soldering rods.

The prior art offers fluxes made from crystalline complexes of caesium/aluminium/fluorine (Cs/Al/F), which are known as caesium fluoroaluminates. A disadvantage of these crystalline substances for use as fluxes is that they are defined compounds with narrow melting ranges or even precise melting points. Moreover, additional substances such as additives for example, with which the basicity or acidity can be adjusted and which have a positive influence on the soldering characteristics, cannot be bound to the crystalline complex.

U.S. Pat. No. 4,689,092 describes a flux consisting of a caesium fluoroaluminate complex which with an appropriate ratio of caesium fluoride (CsF) to aluminium fluoride ($AlF_3$) begins to melt at 440° C. The material exhibits strong crystallinity in the X-ray diffractogram and is not hygroscopic. The material is technically simple to produce by a hydrothermal process from caesium fluoride and aluminium fluoride. However, melting points below 440° C. cannot be achieved; melting points can only be established in the range from 440 to 460° C. Furthermore, the flux does not exhibit good properties for the soldering of materials whose magnesium content is greater than 1%. Moreover, due to its ready oxidisability and its rapid degradation, this flux is not suitable for flame soldering (U.S. Pat. No. 5,171,377).

U.S. Pat. No. 4,923,530 describes the production of an oxygen-containing suspension of caesium fluoroaluminate, which has good stability and a low melting point of 414° C. However, hydrofluoric acid at temperatures of up to 90° C. is used in its production. The handling of the highly toxic hydrofluoric acid under these conditions calls for special requirements for materials and occupational safety. The use of caesium carbonate ($Cs_2CO_3$) in the reaction generates $CO_2$, which forms aerosols containing hydrofluoric acid and fluoride. Furthermore, the aim of this process is to produce a suspension. However, this is unsuitable for the production of soldering rods or anhydrous pastes. A dry powder is needed for that purpose.

U.S. Pat. No. 5,171,377 describes the production of a flux from caesium fluoride, aluminium fluoride and crystalline aluminium hydroxide or aluminium oxide. The complex that is formed permits a broad melting range and is suitable for soldering magnesium-containing aluminium alloys. However, a melting onset below 440° C. cannot be achieved. The use of aluminium hydroxide or aluminium oxide as additives means that no acidity can be established in the flux. The acidity of the flux counteracts the oxidation of the flux.

EP-A-0785045 describes the production of a flux consisting of a caesium fluoroaluminate reaction product with varying ratios of CsF to $AlF_3$. Depending on the ratio of CsF to $AlF_3$, melting points of less than 440° C. down to 427° C. can be achieved with this flux. However, the flux has clearly defined melting points, which shows that it is a crystalline substance.

Thus the fluxes known from the prior art do not correspond to the requirements described in the introduction. In particular, the prior art describes no amorphous caesium fluoroaluminates as fluxes.

OBJECTS AND SUMMARY OF THE INVENTION

The object of the present invention is therefore to provide a flux based on a caesium fluoroaluminate which can be obtained as a dry powder, in which a melting onset below 440° C. can be established, the position and above all the breadth of the melting range can be varied and the acidity or basicity of which can be adjusted using additives. Melting onset is understood here to be the lower end of the melting range. Melting range is understood to be the temperature range extending from the first onset of melting through to complete liquefaction of the substance.

Surprisingly this problem is solved according to the invention by an amorphous caesium aluminium fluoride complex According to the invention, a caesium aluminium fluoride complex or CsAlF complex for short is provided which melts over a relatively large temperature range, i.e. which has a broad melting range. This is possible because the complex according to the invention is amorphous, i.e. it is not crystalline. In amorphous solids the molecular structural elements are arranged not in crystal lattices but randomly. This means that amorphous solids do not have a defined melting point but rather a more or less wide melting range.

DETAILED DESCRIPTION

Figure 1:
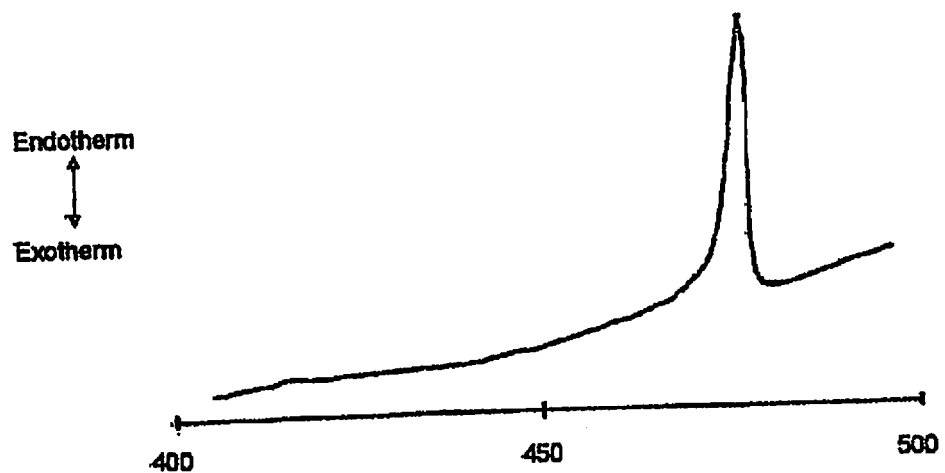
FIG. 1 is a graph showing the differential scanning calorimetry of the CsAlF complex of Example 1.

An elemental analysis of the amorphous CsAlF complex gives substantially the following composition (in wt. %):

| | |
|---|---|
| Cs: | 45-65 |
| Al: | 5-15 |
| F: | 20-40 |

It is known that aluminium fluoride forms complex salts with metal fluorides, for example caesium fluoride. These complex salts are synthesised from $AlF_6$ octahedra. These octahedra group together to form different packing arrangements according to the size and number of the metal ions that are present. Crystals of the compounds $CsAlF_4$, $Cs_2AlF_5$, $Cs_3AlF_6$ are formed in this way. These then show the typical properties of crystalline compounds.

Through skilful reaction control, this aggregation and compound formation is prevented according to the invention so that an amorphous caesium aluminium fluoride complex is formed.

A vacuum mixing dryer known per se has proved to be a suitable reactor for this purpose. It allows multiple process steps to be performed in succession; all process steps of the production process are advantageously performed in one vacuum mixing dryer. A caesium fluoride solution and aluminium fluoride are used as the starting materials. The performance of the process steps is described below by way of example, without limiting the invention:

Process Step 1:

Caesium fluoride dissolved in water is bound to the aluminium fluoride in solid form. The product properties can be controlled during the reaction through the addition of additives. As has been demonstrated, the addition of alkaline or acid compounds can be used to:

1. control the reaction time
2. adjust the amorphicity of the product
3. change the colour of the product from red-brown to bright white
4. specify the properties of the product for paste production
5. achieve suitability for various soldering processes.

The temperature is between 95 and 175° C., preferably between 105 and 150° C. The pressure is between 0.4 and 2.5 bar absolute, preferably between 0.9 and 2.0 bar absolute. The reaction time is between 15 minutes and 6 hours, preferably between 30 minutes and 5 hours.

The reactants CsF and $AlF_3$ are used in a molar ratio of CsF to $AlF_3$ of between 0.9:1 and 3.0:1, preferably in a molar ratio of between 1:1 and 1.5:1. Additives such as $CsHCO_3$, $Cs_2CO_3$, CsOH, dilute hydrofluoric acid or caesium bifluoride, preferably dilute hydrofluoric acid or CsOH, can be used to steer the reaction. These substances can be used individually or as a mixture. The amount of additive that is used is based on the $AlF_3$ that is used. The molar ratio of additive to $AlF_3$ is between 0.001:1 and 0.2:1, preferably between 0.008:1 and 0.1:1.

Process Step 2:

Towards the end of the reaction time of process step 1, the desired basicity or acidity of the end product can be established by the addition of acid or alkaline compounds. The aforementioned additives $CsHCO_3$, $Cs_2CO_3$, CsOH, dilute hydrofluoric acid or caesium bifluoride, preferably dilute hydrofluoric acid or CsOH, are used to this end. The amount of additive that is used is based on the $AlF_3$ that is used. The molar ratio of additive to $AlF_3$ is between 0.0001:1 and 0.3:1, preferably between 0.01:1 and 0.11:1. The temperature and pressure ranges correspond to those of process step 1.

Process Step 3:

On completion of the reaction in process step 2, the water present in the reactor is evaporated very rapidly by application of a strong vacuum in order firstly to maintain the amorphicity of the product as far as possible and secondly to prevent the formation of undesirable secondary products. The reaction suspension changes into a solid in this process. The pressure is reduced to values of between 10 and 100 mbar, preferably between 20 and 40 mbar absolute. The time for which the water is evaporated to obtain the solid is between 5 minutes and one hour, preferably between 15 and 30 minutes.

Process Step 4:

Once the solid has formed, the product is dehydrated to the desired extent at elevated temperatures and under a reduced vacuum. It is possible in this way to achieve residual moisture contents of less than 0.1%. The temperature to this end is between 80 and 300° C., preferably between 100 and 180° C. The pressure to this end is between 10 and 900 mbar, preferably between 20 and 100 mbar. In this way any crystalline hydrates that are formed, which reduce the amorphicity of the product, are destroyed again. Instead of a vacuum, a carrier gas for example can also be used to remove the moisture.

The production process can also be performed in reactors other than a vacuum mixing dryer. For process steps 1 and 2, stirred-tank reactors, kneaders or similar apparatus can also be used, for example. For process step 3, all types of drying apparatus that allow rapid drying can be used, for example spray dryers, belt dryers, fluidised-bed dryers and similar units. For process step 4, all types of drying apparatus that allow drying to be performed at elevated temperature, i.e. above 80° C., can be used, for example drying ovens or rotary kilns.

The production process according to the invention offers clear advantages over the prior art, firstly in terms of the possibility of adjusting the product properties and secondly regarding operational safety and plant costs, preferably if the process is performed in just one reactor and particularly preferably in only a vacuum mixing dryer.

The process according to the invention allows an amorphous CsAlF complex to be produced. Using an X-ray diffractometer this complex can be demonstrated to contain only traces of crystalline $CsAlF_4$ or $Cs_2AlF_5xH_2O$. The reactant CsF cannot be detected in the product, $AlF_3$ only in small amounts.

The melting range of the complex can be adjusted according to the invention by controlling the reaction and varying the ratio of CsF to $AlF_3$. A melting onset below 420° C. can be established. The product is hygroscopic and absorbs moisture slowly from the air.

These advantages over the prior art allow the CsAlF complex according to the invention to be used in a versatile manner. Owing to the multiplicity of different soldering applications, it is necessary to provide specific suitable fluxes corresponding to the individual soldering processes. With the present invention it is possible to produce a wide variety of products.

The potentially disruptive hygroscopicity of the complexes according to the invention can optionally be offset by means of processing measures: For example:

1. In the production of filler wires the flux can be shielded from the environment by the solder;

2. By compressing the flux a small surface area can be achieved and hence the moisture absorption reduced;
3. The moisture absorption can be suppressed by using organic liquids to produce suspensions.

The invention provides in detail:

A process for the production of an amorphous CsAlF complex which is characterised by the following process steps:
- a) Binding the caesium fluoride dissolved in water to the aluminium fluoride in solid form and establishing the desired amorphicity through the addition of acid or alkaline compounds as additives,
- b) Establishing the desired basicity or acidity in the end product through the addition of acid or alkaline compounds as additives,
- c) Applying a strong vacuum on completion of the reaction in order to evaporate very rapidly the water present in the reactor,
- d) Dewatering the product at elevated temperatures and under a reduced vacuum.

Preferences are as follows:

In process step a) a reaction time of between 15 minutes and 6 hours, preferably between 30 minutes and 5 hours, In process step a) and/or b) the addition of additives to control the product properties, In process step a) and/or b) the addition of acid or alkaline compounds as additives to establish the desired basicity or acidity in the end product, In process step a) the addition of acid or alkaline compounds as additives to adjust the amorphicity in the end product, In process step a) and/or b) the addition of additives $CsHCO_3$, $Cs_2CO_3$, CsOH, dilute hydrofluoric acid or caesium bifluoride, particularly preferably dilute hydrofluoric acid or CsOH, In process step a) and/or b) a molar ratio of additive to $AlF_3$ of between 0.0001:1 and 0.3:1, particularly preferably between 0.008:1 and 0.11:1, In process steps a) and b) a temperature of between 95 and 175° C., particularly preferably between 105 and 150° C., In process steps a) and b) a pressure of between 0.4 and 2.5 bar absolute, particularly preferably between 0.9 and 2.0 bar absolute, In process step c) the application of a strong vacuum on completion of the reaction in order to evaporate very rapidly the water present in the reactor, In process step c) the reduction of the pressure to values of between 10 and 100 mbar absolute, particularly preferably between 20 and 40 mbar absolute, In process step c) the conversion of the reaction suspension to a solid, In process step c) a time of between 5 minutes and one hour, particularly preferably between 15 and 30 minutes, for which the water is evaporated to obtain the solid, In process step d) an elevated temperature and a reduced vacuum in order to dehydrate the product to the desired extent, In process step d) the obtaining of residual moisture contents of less than 0.1%, In process step d) a temperature of between 80 and 300° C., particularly preferably between 100 and 180° C., to obtain residual moisture contents of less than 0.1%, In process step d) a pressure of between 10 and 900 mbar, particularly preferably between 20 and 100 mbar, In process step d) the use of a carrier gas to remove the moisture instead of a vacuum;

A process for producing an amorphous CsAlF complex wherein the process is performed exclusively in a single reactor, preferably in a vacuum mixing dryer;

A process for producing an amorphous CsAlF complex wherein process steps a) and b) are performed in stirred-tank reactors and/or kneaders;

A process for producing an amorphous CsAlF complex wherein process step c) is performed in a drying apparatus which allows rapid drying;

A process for producing an amorphous CsAlF complex wherein process step c) is performed in a spray dryer, belt dryer or fluidised-bed dryer;

A process for producing an amorphous CsAlF complex wherein process step d) is performed in a drying apparatus which allows drying at temperatures above 80° C.;

A process for producing an amorphous CsAlF complex wherein process step d) is performed in a drying oven or rotary kiln;

A caesium aluminium fluoride complex which is amorphous, obtainable by one of the processes according to the invention;

An amorphous CsAlF complex with a melting onset below 440° C., preferably below 430° C., particularly preferably below 420° C.;

An amorphous CsAlF complex with a melting range breadth of at least 30° C., preferably at least 50° C., particularly preferably at least 60° C.;

An amorphous CsAlF complex with a melting range breadth of 30 to 90° C., preferably 30 to 80° C., particularly preferably 30 to 70° C.;

An amorphous CsAlF complex with a melting range of between 400 and 500° C., preferably between 410 and 490° C., particularly preferably between 415 and 480° C.;

An amorphous CsAlF complex containing 45 to 65 wt. %, preferably 50 to 60 wt. %, particularly preferably 55 to 60 wt. % of caesium, 5 to 15 wt. %, preferably 7 to 13 wt. %, particularly preferably 8 to 12 wt. % of aluminium and 20 to 40 wt. %, preferably 25 to 35 wt. %, particularly preferably 27 to 33 wt. % of fluorine;

The use of an amorphous CsAlF complex as a flux for the soft soldering of aluminium.

The invention is described in more detail below by means of a number of embodiment examples, without being limited thereto:

Example 1

CsAlF Complex Having a Narrow Melting Range

Process step a: 81 kg of an aqueous 71.4% caesium fluoride solution are placed in a vacuum mixing dryer with vapour condenser and vacuum system and 21 kg of $AlF_3$ are added. The mixture is stirred under normal conditions until a homogeneous suspension is formed. Then 50 kg of 0.2% hydrofluoric acid are added to the suspension as an additive. The mixture is heated to boiling under normal pressure with stirring and is refluxed for 4.5 hours.

Process step b: 5 kg of a 0.1% caesium hydroxide solution are added to the boiling suspension as an additive. 80 kg of water are evaporated off from the suspension within one hour. The vapour is condensed and the volume used to determine the end point of evaporation.

Process step c: A vacuum is applied. A residual pressure of 200 mbar is reached within 5 minutes. The remaining water evaporates very rapidly. After 30 minutes the pulp turns into a free-flowing powder. The residual pressure at the end is 35 mbar.

Process step d: The product is then dried with stirring under maximum vacuum. A product temperature of 160° C. is reached. The drying process is completed after 12 hours and the powder is cooled to 30° C. and removed.

The CsAlF complex obtained has a pH of 6.9, a residual moisture content of 0.8% and a melting interval as follows: onset=474° C., end=478° C. FIG. 1: DSC (differential scanning calorimetry).

Example 2

CsAlF Complex Having a Broad Melting Range

Process step a: 76 kg of an aqueous 75.9% caesium fluoride solution are placed in a vacuum mixing dryer with planetary mixer, vapour condenser and vacuum system and 22 kg of $AlF_3$ are added. The mixture is stirred under normal conditions until a homogeneous suspension is formed. Then 0.9 kg of caesium carbonate are added to the suspension as an additive. The mixture is heated to boiling under normal pressure with stirring and is refluxed for one hour.

Process step b: 5 kg of 0.1% hydrofluoric acid are added to the boiling suspension as an additive. The suspension is heated to boiling under normal pressure.

Process step c: A vacuum is applied. The pressure drops continuously down to 50 mbar. After one hour so much water has evaporated off that a dry powder has been obtained. The residual pressure at the end is 20 mbar.

Process step d: The product is then dried further with stirring under maximum vacuum. A product temperature of 180° C. is reached. The drying process is completed after 8 hours and the powder is cooled to 40° C. and removed.

Figure 2:
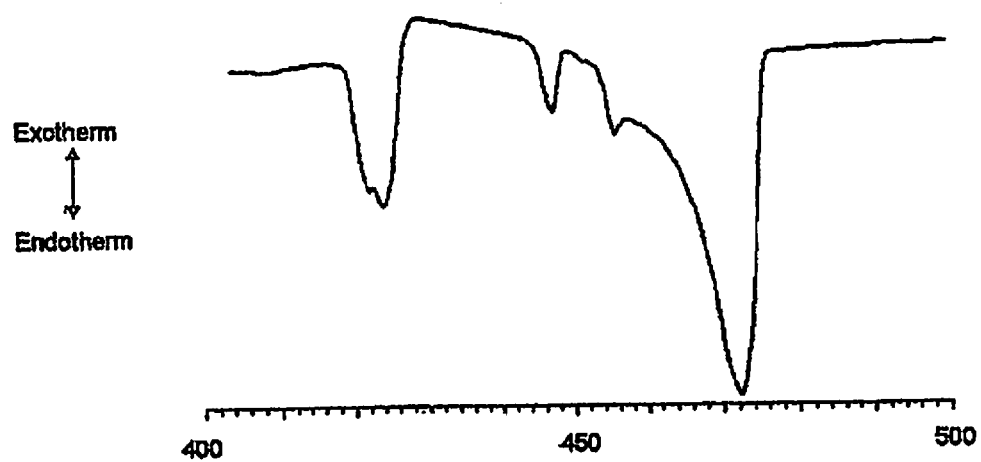
FIG. 2 is a graph showing the differential scanning calorimetry of the CsAlF complex of Example 2.

The CsAlF complex obtained has a pH of 6.6, a residual moisture content of 0.1% and a melting interval with multiple peaks from 419 to 472° C.; FIG. 2: DSC.

It is claimed:

1. A process for the production of an amorphous CsAlF complex comprising:
    a) forming a product by binding cesium fluoride dissolved in water to aluminum fluoride in solid form and adding an additive selected from the group consisting of $CsHCO_3$, $Cs_2CO_3$, CsOH, dilute hydrofluoric acid and cesium bifluoride to adjust the amorphicity; wherein the reaction time is between 15 minutes and 6 hours;
    b) establishing a basicity or acidity in the product of a) through the addition of said additive, wherein the molar ratio of additive to $AlF_3$ is between 0.0001:1 and 0.3:1; wherein during a) and b) the temperature is between 95 and 175° C., and the pressure is between 0.4 and 2.5 bar absolute;
    c) on completion of the reaction, evaporating the water present by applying a vacuum; wherein the pressure is reduced to between 10 and 100 mbar and the time for which the water is evaporated to obtain a solid is between 5 minutes and one hour;
    d) dewatering the solid obtained in c) at a temperature between 80 and 300° C. and a pressure between 10 and 900 mbar;
    wherein the amorphous CsAlF complex does not contain oxygen and CsF is not present in the amorphous CsAlF complex.

2. A process according to claim 1, wherein during process steps a) and b) the temperature between 105 and 150° C.

3. A process according to claim 1, wherein during process steps a) and b) the pressure is between 0.9 and 2.0 bar absolute.

4. A process according to at least one of claim 1, wherein during process step a) the reaction time is between 30 minutes and 5 hours.

5. A process according to claim 1, wherein during process at least one of steps a) and b) said additive is dilute hydrofluoric acid or CsOH.

6. A process according claim 1, wherein the molar ratio of additive to $AlF_3$ in step a) and/or b) is between 0.008:1 and 0.11:1.

7. A process according to claim 1, wherein during process step c) the pressure is reduced to values of between 20 and 40 mbar absolute.

8. A process according to claim 1, wherein during process step c) the time for which the water is evaporated to obtain the solid is between 15 and 30 minutes.

9. A process according to claim 1, wherein during process step d) residual moisture contents of less than 0.1% are achieved.

10. A process according to claim 1, wherein during process step d) the temperature is between 100 and 180° C.

11. A process according to claim 1, wherein during process step d) the pressure is between 20 and 100 mbar.

12. A process according to claim 1, wherein during process step d) a carrier gas is used for the dewatering.

13. A process according to claim 1, wherein the process is performed in a vacuum mixing dryer.

14. A process according to claim 1, wherein process at least one of steps a) and b) are performed in a stirred-tank reactor or a kneader.

15. A process according to claim 1, wherein process step c) is performed in a drying apparatus.

16. A process according to claim 1, wherein process step c) is performed in a dryer selected from the group consisting of a spray dryer, a belt dryer and a fluidized-bed dryer.

17. A process according to claim 1, wherein process step d) is performed in a drying oven or rotary kiln.

18. A process as in claim 1 further comprising soft soldering of aluminum by:
    applying to the aluminum to be soldered a flux comprising the amorphous CsAlF complex, and
    soldering the aluminum.

19. A process according to claim 1, wherein the amorphous CsAlF complex melts at temperatures in the range between 400 and 500° C.

20. A process as in claim 1 wherein the ingredients consist of cesium fluoride, water, aluminum fluoride, and one or more of $CsHCO_3$, $Cs_2CO_3$, CsOH, dilute hydrofluoric acid and/or cesium bifluoride.

21. An amorphous CsAlF complex obtained according to the process of claim 1; wherein the amorphous CsAlF complex melts at temperatures in the range of from 400° C. to 500° C., wherein the amorphous CsAlF complex does not contain oxygen and CsF is not present in the amorphous CsAlF complex.

22. An amorphous CsAlF complex according to claim 21, wherein the melting onset of the complex is below 440° C.

23. An amorphous CsAlF complex according to claim 22, wherein the melting onset of the complex is below 430° C.

24. An amorphous CsAlF complex according to claim 22, wherein the melting onset of the complex is below 420° C.

25. An amorphous CsAlF complex according to claim 21, wherein the amorphous CsAlF complex melts at temperatures in the range between 410 to 490° C.

26. An amorphous CsAlF complex according to claim 21, wherein the melting range of the complex is between 415 and 480° C.

27. An amorphous CsAlF complex according to claim 21, containing from 45 to 65 wt. % of cesium, from 5 to 15 wt. % of aluminum and from 20 to 40 wt. % of fluorine.

28. An amorphous CsAlF complex according to claim 27, containing from 50 to 60 wt. % of cesium, from 7 to 13 wt. % of aluminum and from 25 to 35 wt. % of fluorine.

29. An amorphous CsAlF complex according to claim 27, containing from 55 to 60 wt. % of cesium, from 8 to 12 wt. % of aluminum and from 27 to 33 wt. % of fluorine.

30. An amorphous CsAlF complex according to claim 21, which complex is at least a portion of a soldering flux, wherein the soldering flux is in contact with aluminum.

31. An amorphous CsAlF complex of claim 21, which complex is at least a portion of a soldering flux.

32. An amorphous CsAlF complex obtained according to the process of claim 1 wherein the molar ratio of the acid or alkaline compound to $AlF_3$ is between 0.0001:1 and 0.3:1; and wherein the amorphous CsAlF complex melts at temperatures in the range of from 400° C. to 500° C.

33. An amorphous CsAlF complex obtained according to the process of claim 1 wherein the additive is selected from the group consisting of $CsHCO_3$, $Cs2CO_3$, CsOH and cesium bifluoride.

* * * * *